April 25, 1967           E. I. GROFF           3,315,618

METHOD AND APPARATUS FOR FORMING GENERALLY ANNULAR PRETZELS

Filed Jan. 13, 1965           5 Sheets-Sheet 1

INVENTOR.
EDWIN I. GROFF
BY Robertson and Voutie
ATTORNEYS

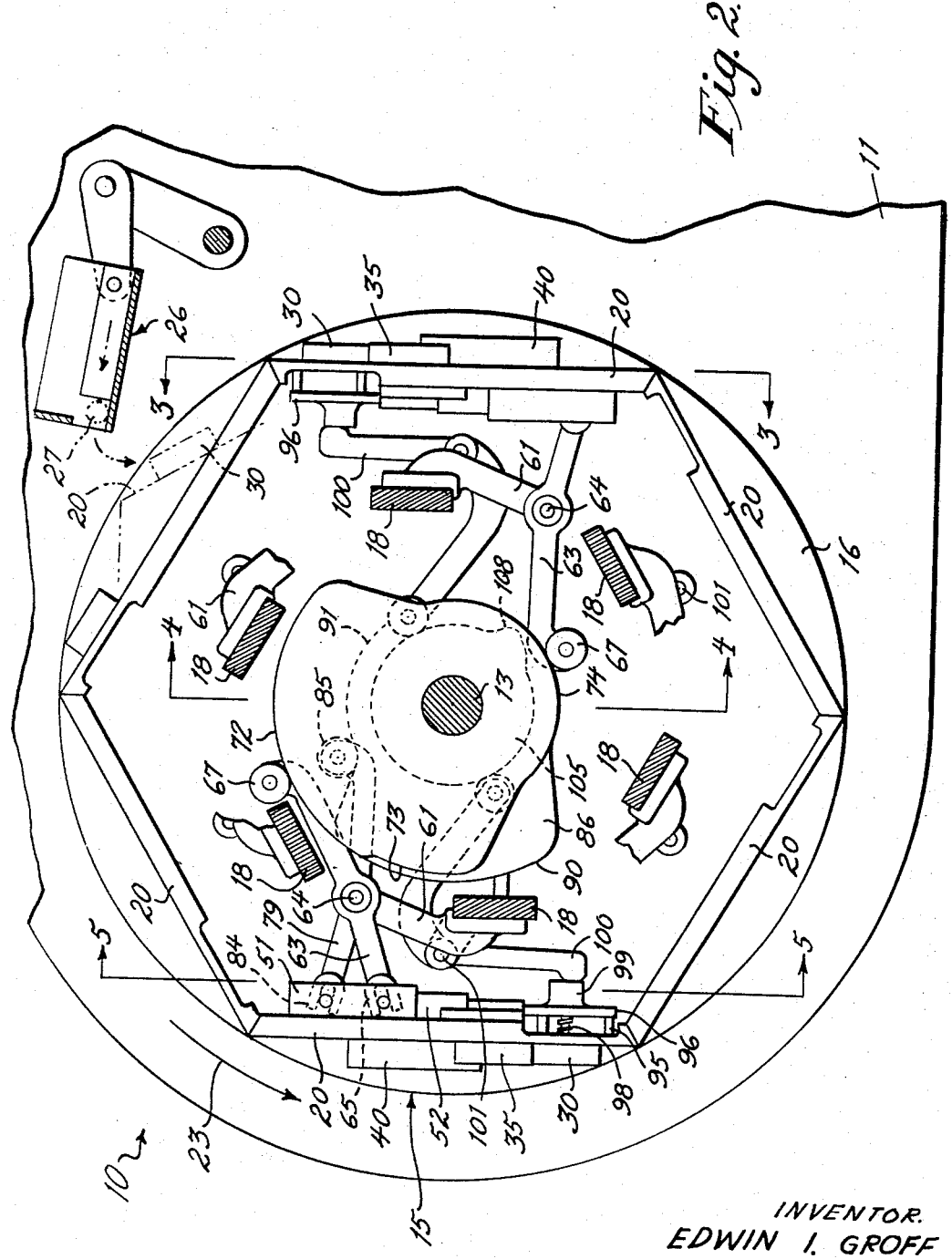

April 25, 1967  E. I. GROFF  3,315,618
METHOD AND APPARATUS FOR FORMING GENERALLY ANNULAR PRETZELS
Filed Jan. 13, 1965  5 Sheets-Sheet 3
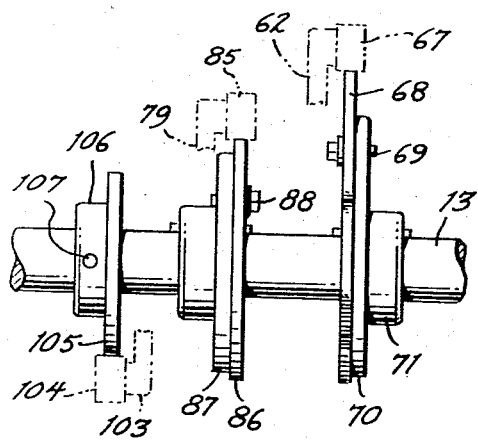
Fig. 4.
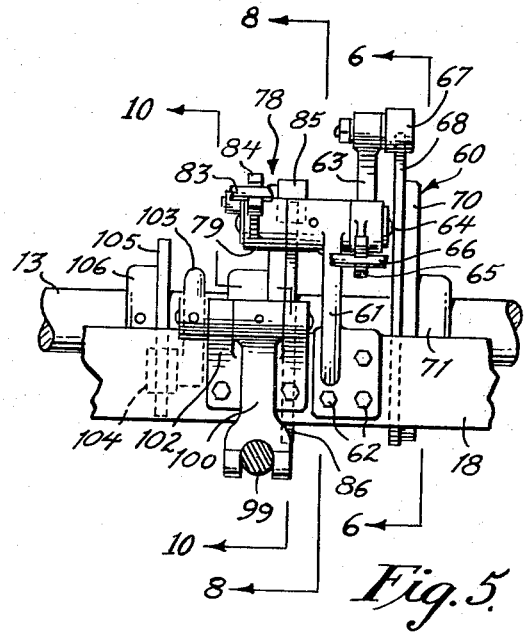
Fig. 5.
Fig. 7.
Fig. 6.
INVENTOR.
EDWIN I. GROFF
BY Robertson and Yonte
ATTORNEYS

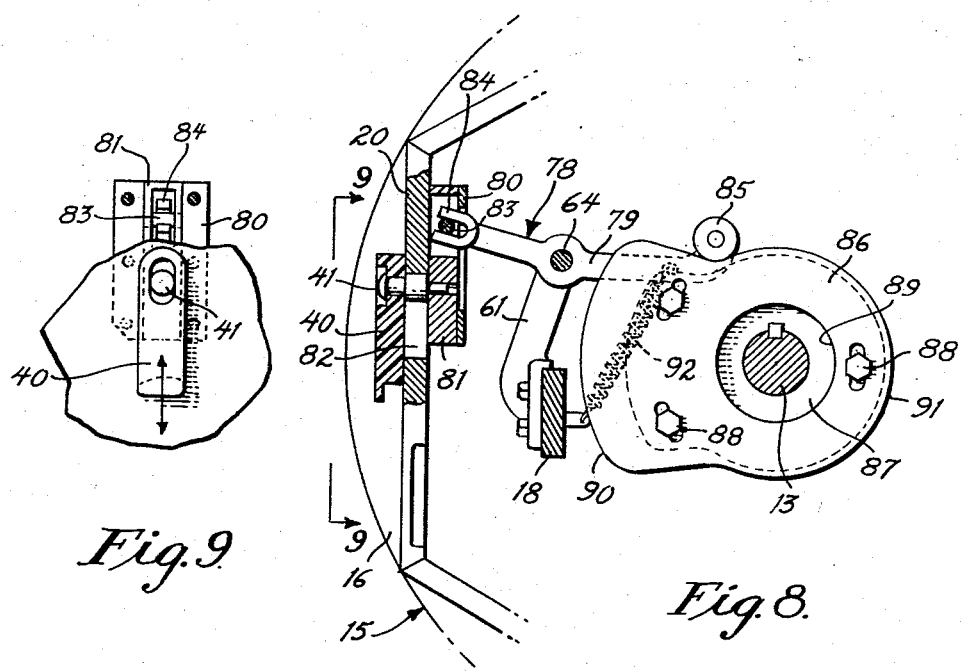
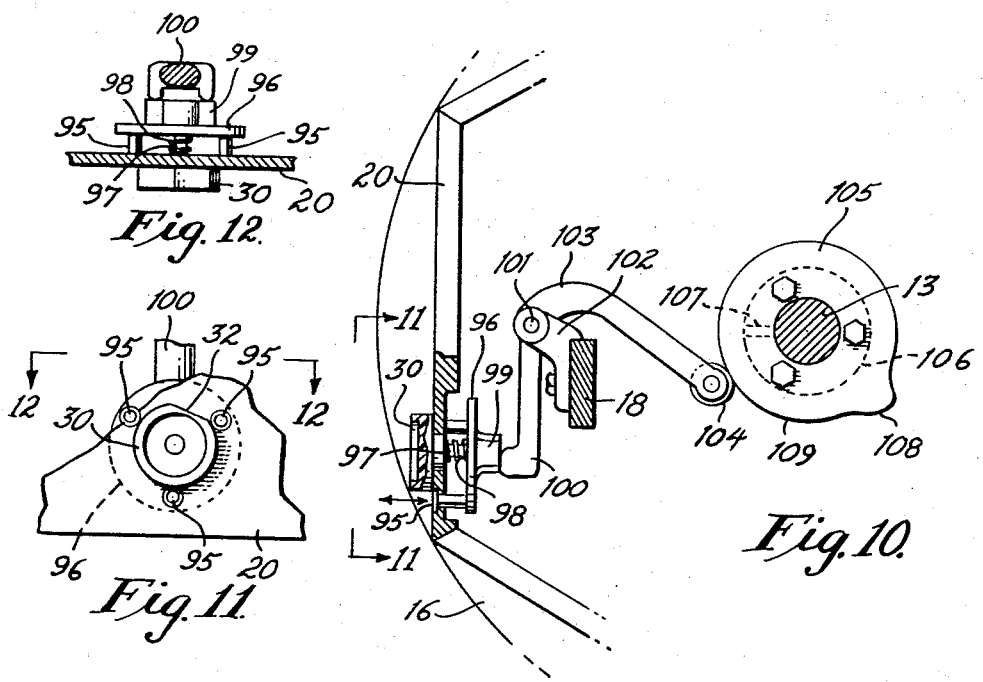

April 25, 1967   E. I. GROFF   3,315,618
METHOD AND APPARATUS FOR FORMING GENERALLY ANNULAR PRETZELS
Filed Jan. 13, 1965                     5 Sheets-Sheet 5

INVENTOR.
EDWIN I. GROFF
BY Robertson and Voutie
ATTORNEYS

United States Patent Office 3,315,618
Patented Apr. 25, 1967

3,315,618
METHOD AND APPARATUS FOR FORMING GENERALLY ANNULAR PRETZELS
Edwin I. Groff, West Reading, Pa., assignor to Quinlan Pretzel Company, Inc., Reading, Pa., a corporation of Pennsylvania
Filed Jan. 13, 1965, Ser. No. 425,258
14 Claims. (Cl. 107—8)

This invention relates generally to the forming of annular pretzels and the like, and embraces a unique mechanism and method for forming a plastic strip in an annular configuration.

While the method and apparatus of the present invention have been primarily developed and employed in the manufacture of pretzels from plastic dough strips, and will be illustrated and described hereinafter with particular reference thereto, it is understood that the invention is capable of many varied applications, all of which are intended to be comprehended herein.

It is an important object of the present invention to provide an apparatus and mechanism for forming annular pretzels, which mechanism is relatively simple in structure, requiring a minimum number of parts, durable and reliable throughout a long useful life.

It is a further object of the present invention to provide a method and apparatus for forming annular pretzels, which is rapid in production to effect substantial savings in manufacturing costs.

The instant invention further contemplates a unique method and apparatus wherein an annular pretzel may be formed by depositing a dough strip in plastic condition over a mandrel to assume an inverted generally U-shaped configuration, the depending legs of the dough strip being then bent inwardly, and the free ends thereof squeezed together against the mandrel.

Other objects of the present invention will become apparent upon reading the following specification and referring to the accompanying drawings, which form a material part of this disclosure.

The invention accordingly consists in the features of construction, and combinations and arrangements of elements and methods steps, as will appear in the following description, and of which the scope will be indicated by the appended claims.

In the drawings:

FIGURE 2 is a sectional elevational view taken generally along the line 2—2 of FIGURE 1, only two of the six identical forming mechanisms being shown completely;

FIGURE 4 is a partial sectional elevational view taken generally along the line 4—4 of FIGURE 2, illustrating fixed actuating cams of the present invention, and showing associated cam followers in phantom;

FIGURE 5 is a partial sectional elevational view taken generally along the line 5—5 of FIGURE 2;

FIGURE 6 is a partial sectional elevational view taken generally along the line 6—6 of FIGURE 5;

FIGURE 7 is a partial sectional elevational view taken generally along the line 7—7 of FIGURE 6;

FIGURE 8 is a partial sectional elevational view taken generally along the line 8—8 of FIGURE 5;

FIGURE 9 is a fragmentary elevational view taken generally along the line 9—9 of FIGURE 8, with parts broken away for illustrative purposes;

FIGURE 10 is a partial sectional elevational view taken generally along the line 10—10 of FIGURE 5;

FIGURE 11 is a fragmentary elevational view taken generally along the line 11—11 of FIGURE 10, with parts broken away;

FIGURE 12 is a partial sectional view taken generally along the line 12—12 of FIGURE 11;

Figure 1:
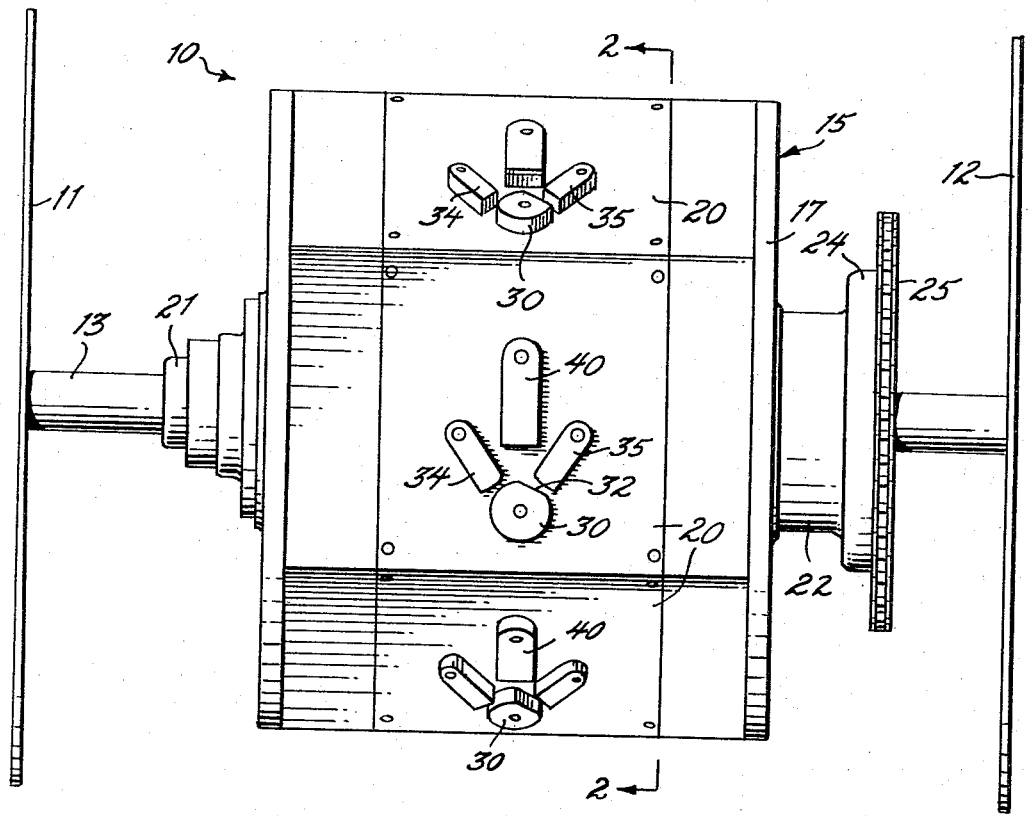
FIGURE 1 is a front elevational view of the apparatus of the present invention, being the discharge side thereof.

Referring now more particularly to the drawings, and specifically to FIGURES 1 and 2 thereof, the annular-pretzel-forming machine of the present invention is there generally designated 10, and includes a pair of parallel spaced, generally vertically disposed facing plates 11 and 12 fixedly carrying a generally horizontal shaft 13 extending between the plates. A drum 15 is generally axially mounted on the shaft 13 for rotation about the horizontal axis of the fixed shaft. The upstanding mounting plates 11 and 12 may be fixed by any suitable means, and in practice may be fixedly secured to a conventional dough-strip forming machine (not shown).

The drum 15 may include a pair of generally circular end plates 16 and 17 concentrically circumposed about the shaft 13, respectively adjacent to mounting plates 11 and 12, and fixedly secured together, as by a plurality of tie members or bars 18 interiorly of the drum 15, extending between and having their opposite ends fixedly secured to drum end walls 16 and 17. At best seen in FIGURE 2, the tie members 18 extend in substantial parallelism, being arranged in equal, circumferentially spaced relation about the axis of shaft 13, spaced inward from the peripheries of drum ends 16 and 17.

Also extending between the drum end walls 16 and 17 are a plurality of mechanism supports or plates 20 arranged in adjacent relation circumferentially about the drum. The supports or plates 20 may each be generally flat and extend chordally of the drum 15, being illustrated as six in number, and each located radially outward of and adjacent to a respective tie member or bar 18. The drum 15 is mounted for generally axial rotation about the shaft 13 by bearings 21 and 22, respectively carried by drum ends 16 and 17. Rotation of the drum 15 is effected in the direction of arrow 23, see FIGURE 2, by any suitable drive means, such as a sprocket wheel 24 on bearing 22, and chain 25, see FIGURE 1. A dough-strip depositor is generally designated 26, and adapted to deposit or deliver toward the drum 15 a properly sized strip of dough 27. The dough-strip depositor may be conventional, such as disclosed in my prior United States Patent No. 2,747,523.

Figure 3:
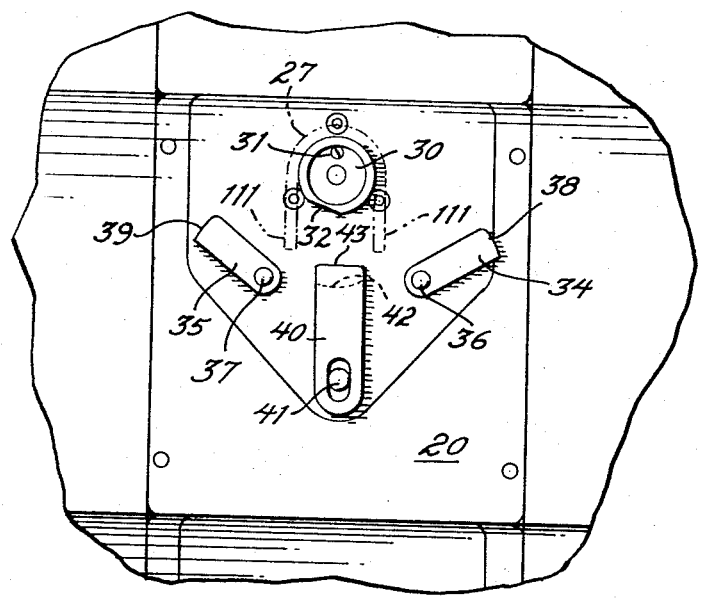
FIGURE 3 is a partial rear elevational view of the instant apparatus, showing the receiving side, as along line 3—3 of FIGURE 2.

Each support plate 20 is provided on its radially outer or working face with a generally cylindrical, fixed, outwardly projecting boss or mandrel 30. Each mandrel 30, see FIGURES 2 and 3, may be located adjacent to and spaced from the upper edge of its respective support plate 20 as the latter moves upward in FIGURE 2. The mandrels 30 may be detachably fixed to their respective plates 20, as by fasteners 31, or other suitable means. As best seen in FIGURE 3, each mandrel 30 is generally of cylindrical configuration, projecting normally from the outer or working face of its support plate 20, and formed through an arc of about 50 degrees with a chordal flat 32. It will be observed that the chordal flat 32 is on the underside of each mandrel 30 when the latter is moving upward, and the chordal flat is offset almost beyond the vertical centerline of its mandrel.

Also provided on the external or working face of each support plate 20 are a pair of bending elements or pivoted arms 34 and 35. In the position of FIGURE 3, the arms 34 and 35 are located below and spaced on opposite sides of the mandrel 30, each having one end pivoted to the plate 20 by pivot pins 36 and 37. The opposite or free ends 38 and 39 of respective arms 34 and 35 are swingable toward and away from the mandrel 30, as between the positions of FIGURE 3 and 14, in the latter position the arms extending toward and generally radially of the mandrel.

Figures 14, 15:
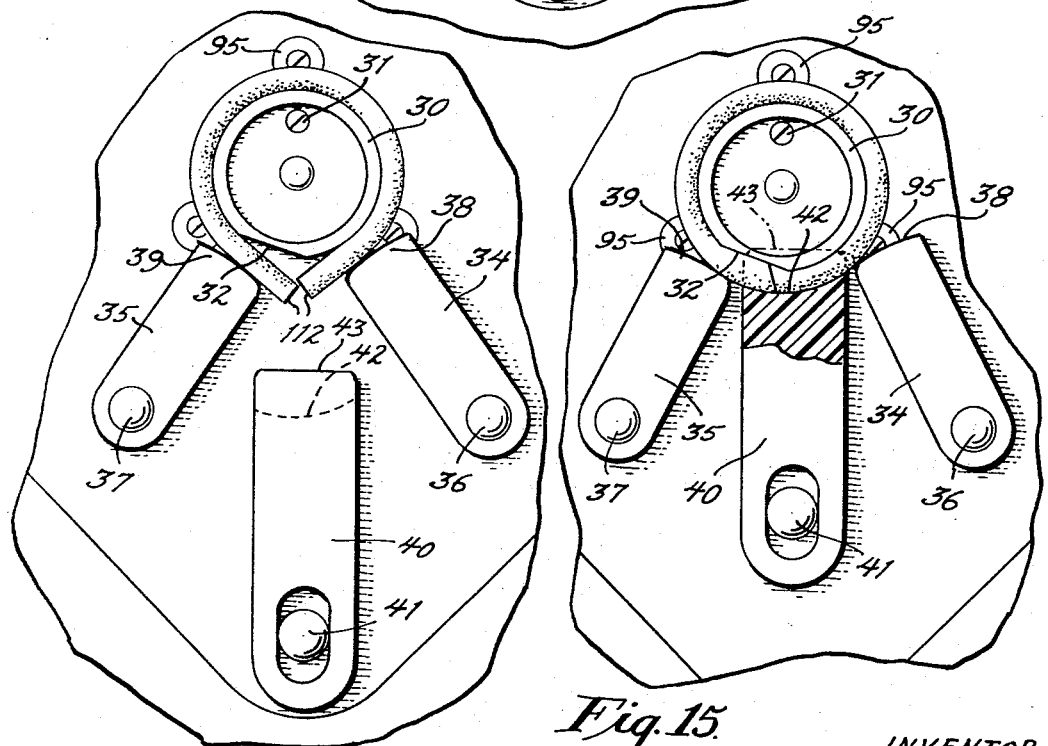
FIGURE 14 is a fragmentary view similar to FIGURE 13 illustrating on intermediate step in formation of the dough strip.
FIGURE 15 is a fragmentary view similar to FIGURES 13 and 14 illustrating the final step in forming the dough strip into an annulus or ring.

Spaced beneath the mandrel 30, in the position of FIGURE 3, is a slidable closure member 40. The closure member 40 may be of elongate configuration, as illustrated, extending generally vertically on the outer or working face of support plate 20 beneath mandrel 30, and slidable endwise toward and away from the mandrel. The closure element 40 may be mounted on its support plate 20, as by a pin 41 remote from the mandrel 30, for its sliding movement toward and away from the latter. Further, the closure element 40 advantageously has its longitudinal centerline laterally offset from the vertical centerline of the mandrel, while the end of the closure element adjacent to the mandrel is slotted to provide an arcuate, concave surface 42 generally concentric with the mandrel 30 when the closure element is in its position of movement toward the mandrel. As the closure element is offset laterally of the vertical centerline of the mandrel 30 in the direction opposite to that of the chordal flat 32, the concave surface 42 only partially overlaps the chordal flat and extends considerably beyond the latter, in the position of closure movement toward the mandrel, as best seen in FIGURE 15. It will also be noted that the closure element 40 is provided with an extension or lip 43 projecting toward the mandrel 30 and spaced outward therebeyond.

Internally of the drum 15, each pair of bending elements or arms 34 and 35 is provided with an operating mechanism, generally designated 45 and best seen in FIGURES 6 and 7. The operating mechanism 45 may include a lever 46 fixed by pivot pin 36 to the arm 34 and extending generally oppositely away from the latter. A bell crank 47 may be fixed by the pivot pin 37 to the arm 35, and a link 48 has its opposite ends pivotally connected, as at 49 and 50, to the lever 46 and bell crank 47, respectively. Fixedly secured on the inner side of support plate 20 is a slideway or guide 51 carrying a slide member 52 for movement in a plane generally normal to the drum axis. The slide 52 has one end pivotally connected, as by pivot pin 53 to one end of a link 54, which link has its other end connected to the bell crank 47 by a pivot pin 55. Upon up-and-down movement of the slide member 52, as indicated by the arrow 56, the bell crank 47 is oscillated about the axis of pivot pin 37, and in turn rocks the lever 46 about the axis of pivot pin 36, to effect swinging movement of arms 34 and 35 as indicated by arrows 57 and 58.

The above-described operation of arms 34 and 35 is actuated by an actuating mechanism, generally designated 60, and best seen in FIGURES 5 and 6. The actuating mechanism includes an arm 61 fixedly secured to the adjacent tie member or bar 18, as by fasteners 62, and extending transversely therefrom. A lever 63 is pivoted intermediate its ends, as by pivot pin 64, to the extending end of arm 61. One end of lever 63 may be bifurcated, as at 65, providing a yoke in sliding engagement with a crosspin 66 of slide member 52. Upon rotation of the lever 63 about its pivot pin 64, the yoke 65 engages bar 66 of slide member 52 to effect sliding movement of the latter in guideway 51 and swinging movement of arms 34 and 35.

The opposite end of lever 63 is provided with a cam follower 67, such as a roller, and a cam 68 is fixedly circumposed about the shaft 13. The cam 68 may be adjustably attached, as by bolt-in-slot connections 69, to a mounting plate 70 keyed to the shaft 13 through a collar 71. The cam 68 is formed with a raised cam edge or lobe 72 and a slightly inset cam edge portion 73, the remaining cam edge portion 74 being of greatly reduced radius. A coil tension spring 75 may be connected between the bar 18 and lever 63, adjacent to the follower 67, to maintain the latter in rolling engagement with the cam edge. Upon rotation of the drum counterclockwise, as seen in FIGURE 6, about the axis of shaft 13, the follower 67 rides on the cam edge portion 72 to actuate inward swinging movement of the arms 34 and 35, while movement of the follower to the cam edge portion 73 effects slight outward swinging movement of the arms, for a purpose appearing presently. Continued drum rotation moves the cam follower 67 along the cam edge 74 to swing the arms outward away from the mandrel 30.

A mechanism for operating the closure element 40 is best seen in FIGURES 8 and 9. The closure-element operating means is generally designated 78 and includes a lever 79 pivotally mounted intermediate its ends on the pivot or journal shaft 64 of arm 61. In FIGURE 5 it may be seen that the lever 63 of arm-operating means 60 may be pivotally mounted on one side of the arm 61, and the lever 79 may be pivotally mounted on the other side of the arm 61. In FIGURES 8 and 9 it is seen that a guide or slideway 80 is fixed on the inner side of each support plate 20 and carries therein a slidable member or block 81. The lever shaft 64 is generally parallel to the fixed drum shaft 13, and the block 81 is mounted in the guide 80 for back-and-forth sliding movement in a plane generally normal to the axes of shafts 13 and 64. The block 81 is connected to the closure element 40 by a pin or fastener 41 extending through a slot 82 formed in the support plate 20, and the block carries a crosspin 83 interiorly of the support plate. The outer end of lever 79 is provided with a yoke 84 slidably receiving the pin 83 of slide member 81, whereby the slide member is reciprocated upon oscillation of the lever about its axis 64.

The opposite, inner end of the lever 79 is provided with a cam follower or roller 85 for rolling engagement with a cam 86 fixed to the shaft 13 upon rotation of drum 15. The cam 86 is adjustably fixed to a mounting plate 87, as by bolt-in-slot connections 88, the mounting plate being keyed to the fixed shaft 13, which extends through a hole 89 of cam 86. The working surface of cam 86 may include a radially outstanding lobe portion 90, and a radially inset dwell portion 91. The cam follower 85 is maintained in contact with the cam surface portions 90 and 91 by suitable resilient means, such as a tension spring 92 connected between the bar 18 and inner end of lever 79. Thus, upon drum rotation about the fixed shaft 13, wherein the bar 18 and lever 79 rotate about the cam 86 fixed to the shaft 13, the cam follower 85 is moved outward along the cam portion 90 to shift the closure element 40 toward the adjacent mandrel, and as the cam follower moves radially inward of the drum in riding along cam surface portion 91, the closure element is shifted away from its associated mandrel. Thus, the cam 86 provides actuating means for actuating the operating lever 79, which in turn operates the closure element 40.

At circumferentially spaced locations about the mandrel 30 may be located a plurality of headed ejector members or pins 95, see FIGURES 10-12. The pins 95 each extend slidably through and generally normal to the respective support plate 20, being normally disposed in a retracted position, see FIGURE 10, with the pin heads substantially flush with the outer or working face of the support plate. Interiorly of the support plate 20 the several ejector members 95 may be rigidly connected together, as by an annular connection member or plate 96. A rod 97 is fixed to the support plate 20 and projects inward therefrom centrally through the plate 96, the rod carrying a compression spring 98 resiliently urging the plate inward to retract the ejector pins 95. A hollow boss 99 may project inward from the plate 96, receiving the pin 97 upon outward movement of the plate to extend the ejector pins.

Operation of the retractile and extensile action of ejector pins 95 is effected by an operating lever 100 having one end keyed to a pivot pin 101 carried by an arm 102 fixed to the bar 18. The other end of the lever 100, remote from the pivotal mounting 101, is engageable with the boss 99 to shift plate 96 outward and extend the ejector pins 95. Also keyed to the pivotal shaft 101 is one end of an operating arm 103, which has its other end provided with a cam follower or roller 104.

In order to actuate the operating mechanism 100, 103, an actuating cam 105 is circumposed about the fixed drum shaft 13 and adjustably fixed relative to the latter, as by a collar 106 and a setscrew 107. The actuating surface or peripheral edge of cam 105 includes a relatively short operating lobe portion 108, the remainder being a dwell portion 109 disposed radially inward of the operating portion. Upon rotation of drum 15 about the fixed cam 105, the operating mechanism 100, 103 is inactive as follower 104 rides along the dwell portion 109. However, as follower 104 rides over lobe portion 108, the operating arm 103 and lever 100 are swung clockwise, as seen in FIGURE 10, to effect momentary extension of ejector pins 95 beyond the working surface of plate 20.

While only a single mechanism, associated with a single support plate 20, has been described in detail, it is appreciated that duplicates of such mechanism are associated with each support plate.

Figure 13:
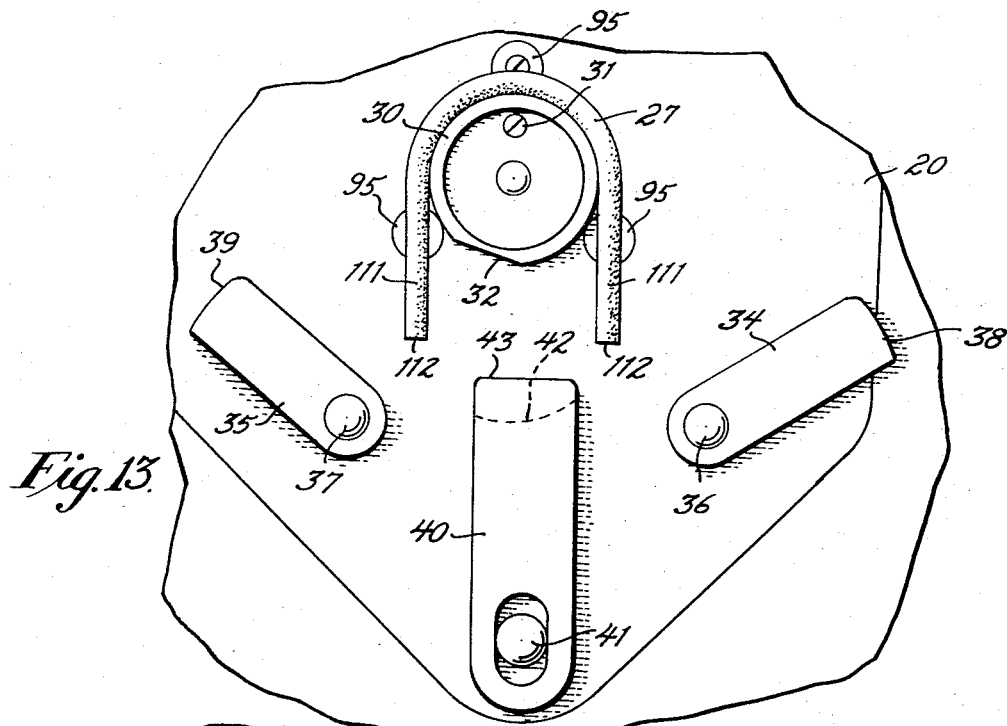
FIGURE 13 is a fragmentary elevational view similar to FIGURE 3, showing a forming mechanism just having been loaded with a dough strip.

Operation may best be understood by reference to FIGURE 2. The drum 15 is continuously rotated counterclockwise, and as each support plate 20 moves into the position illustrated in dot-and-dash outline, which may be considered as a loading station, the dough-strip depositor gravitationally delivers a dough strip to the mandrel 30 at the loading station. That is, the dough strip 27, in a plastic condition, is draped over the mandrel 30, so that the dough strip assumes the inverted, generally U-shaped configuration shown in FIGURES 3 and 13. It will there be observed that the leg portions 111 of the U-shaped dough strip 27 depend on opposite sides of the mandrel and below the latter, depending into position between the mandrel and respective bending elements or arms 34 and 35. At the loading station, the arms 34 and 35 are swung outward away from the mandrel 20, being located on opposite sides of and below the latter, while the closure element 40 is spaced between the arms and shifted away from the mandrel. The follower 67 of arm-operating lever 63 is riding on cam dwell portion 74, while the follower 85 of closure-element operating lever 79 is riding on its cam dwell portion 91.

Upon continued drum rotation, the follower 67 rides up on its operating cam portion 72 to cause inward swinging movement of the arms 34 and 35 toward the mandrel 30. The free ends 38 and 39 of the arms 34 and 35 engage respective depending legs 111 of the dough strip 27 to bend the legs inward toward the mandrel to the position shown in FIGURE 14. In this condition, the arms 34 and 35 extend generally radially of the mandrel 30, being equally spaced approximately 30 degrees on opposite sides of the vertical mandrel centerline.

Further drum rotation causes the follower 85 of operating lever 79 to ride up on lobe portion 90 of cam 86, and thereby shift closure element 40 toward the adjacent portion of mandrel 30. Substantially simultaneously, the cam follower 67 of arm-operating lever 63 rides down onto inset lobe portion 73 to effect slight withdrawal or swinging away of the arms 34 and 35. As the arms 34 and 35, upon their full inward swinging movement to the position of FIGURE 14, move slightly into the path of movement of closure element 40 toward the mandrel, it is advantageous to withdraw the arms out of the path of closure-element movement while retaining the arms proximate to the mandrel.

This position is illustrated in FIGURE 15. It will there be seen that the arcuate surface 42 of closure element 40 has moved into generally concentric relation with the mandrel 30. As the chordal flat 32 of the mandrel 30, and the arcuate surface 42 of the mandrel 40 are partially overlapping, but offset in opposite directions with respect to the vertical centerline of the mandrel, the free ends 112 of the dough strip 27 are pressed or squeezed together, and the material of the dough strip is moved against the chordal flat while the exterior configuration of the dough strip is substantially circular. The length of the dough strip 27 is advantageously slightly greater than the circumference of the mandrel 30, so that the above described squeezing action effects pasting together of the dough-strip ends. Of course, the lip 43 of the closure element 40 engages over the dough-strip ends 112 to prevent outward squeezing thereof and insure proper pasting action.

The followers 67 and 85 may then successively roll off from their operating lobes 73 and 90 to move the arms 34 and 35, and closure element 40 away from the mandrel 30. The ejector-operating arm 103 may then, by its follower 104, engage lobe 108 to effect extension of ejector pins 95 for ejecting the annular dough formation to a conveyor belt, or the like.

From the foregoing, it is seen that the present invention provides a method and apparatus for forming annular pretzels and the like, which fully accomplish their intended objects and are well adapted to meet practical conditions of use.

Although the present invention has been described in some detail by way of illustration and example for purposes of clarity of understanding, it is understood that certain changes and modifications may be made within the spirit of the invention and scope of the appended claims.

What is claimed is:

1. A mechanism for forming generally annular pretzels, said mechanism comprising a support plate having a working face, a mandrel projecting from said working face for medially engaging a dough strip to support the latter in inverted generally U-shaped configuration, a pair of bending elements mounted on said working face spaced from said mandrel for movement toward the latter for bending the legs of said dough strip inwardly against said mandrel, and a closure element mounted on said working face spaced between said bending elements for movement toward said mandrel to press the inwardly bent ends of said dough-strip legs together and against said mandrel.

2. A mechanism according to claim 1, said bending elements each comprising an arm spaced below and on respective sides of said mandrel when the latter is in dough-strip-receiving position, and pivot means mounting said arms for swinging movement toward and away from said mandrel.

3. A mechanism according to claim 2, said closure element comprising a slotted member spaced between said arms and slidably mounted for shifting movement toward and away from said mandrel, said slide member having an arcuate concave surface facing toward said mandrel for molding engagement with the dough-strip ends.

4. A mechanism according to claim 1, said mandrel being generally cylindrical and having a chordal flat located on the underside of said mandrel when in receiving position, said closure element having an arcuately concave surface proximate to and facing generally toward said flat.

5. A mechanism according to claim 4, said closure element comprising a slide member spaced between said arms and mounted for movement toward and away from said mandrel generally along a radius thereof, said concave closure-element surface and said flat being partially overlapping and offset in opposite directions from said radius when said closure element is moved toward said mandrel.

6. A mechanism according to claim 5, said concave closure-element surface being generally concentric with said mandrel when moved toward the latter.

7. In the method of forming a generally annular pretzel, the steps which comprise: providing a plastic dough strip; disposing said dough strip over a mandrel projecting laterally from a generally upright surface to gravitationally suspend the dough strip on said mandrel in an inverted U-shaped configuration against said surface with it legs depending on opposite sides below the mandrel; moving the depending legs inwardly toward the mandrel to swing the free ends of the legs into adjacent relation; and pressing the free ends of the legs together and radially inwardly against the mandrel to completely surround the latter.

8. The method according to claim 7, further characterized in providing a dough strip of a length slightly greater than the circumference of the mandrel, whereby the free leg ends are squeezed together upon said pressing.

9. A mechanism for forming generally annular pretzels, said mechanism comprising a drum mounted for rotation about a generally horizontal axis, a plurality of plates arranged chordally about the circumference of said drum for rotation with the latter, a generally cylindrical mandrel projecting from each of said plates radially outward of said drum, delivery means located at a loading station externally of said drum for delivering a dough strip to each mandrel upon movement thereof to said loading station, a delivered dough strip depending in inverted U-shaped configuration on opposite sides of the supporting mandrel, a pair of dough-strip bending arms rotatably mounted externally on each plate and located on opposite sides of the adjacent mandrel for movement toward and away from the latter to bend the depending legs of a delivered dough strip toward the supporting mandrel, arm-operating means mounted interiorly of said drum for rotation therewith and connected to said arms for effecting swinging movement thereof, arm-actuating means fixedly located interiorly of said drum and engageable with said arm-operating means to actuate the latter upon drum rotation, a closure element mounted externally on each plate spaced between said bending arms for movement toward and away from the adjacent mandrel to press the inwardly bent ends of said dough-strip legs together and against said mandrel, closure-element operating means mounted interiorly of said drum for rotation therewith and connected to said closure element for effecting movement thereof, and closure-element actuating means fixedly located interiorly of said drum and engageable with said closure-element operating means to actuate the latter upon drum rotation.

10. A machine according to claim 9, said arm- and closure-element actuating means comprising cam means fixed centrally of said drum.

11. A machine according to claim 10, said cam means being configured to rotate said arms toward the adjacent mandrel into the path of closure-element movement and to swing said arms out of said path upon closure-element movement.

12. A machine according to claim 9, in combination with an ejector carried by each of said plates adjacent to the respective mandrel for extensile and retractile movement relative to the carrying plate to eject a dough strip from the adjacent mandrel, ejector-operating means mounted interiorly of said drum for rotation therewith and connected to said ejector for effecting movement thereof, and ejector-actuating means fixedly located interiorly of said drum and engageable with said ejector-operating means to actuate the latter upon drum rotation.

13. A machine according to claim 12, said arm-, closure-element and ejector-actuating means comprising cam means fixed centrally of said drum.

14. A mechanism for forming generally annular pretzels, said mechanism comprising a support plate having a working face, a mandrel projecting from said working face for medially engaging a dough strip to support the latter in inverted generally U-shaped configuration, a pair of bending elements mounted on said working face for swinging movement toward and away from said mandrel to bend the legs of said dough strip inwardly against said mandrel, a closure element mounted on said working face spaced between said bending elements for movement through the path of movement of said bending elements toward and away from said mandrel to press the inwardly bent ends of said dough-strip legs toward and against said mandrel, and operating means for operating said bending elements and closure element in timed relation to move the bending elements out of the path of movement of said closure element.

References Cited by the Examiner

UNITED STATES PATENTS

| 1,726,113 | 8/1929 | Miller | 107—4 |
| 1,755,921 | 4/1930 | Gendler | 107—69 |

WALTER A. SCHEEL, *Primary Examiner.*

J. SHEA, *Assistant Examiner.*